United States Patent
Haug et al.

(10) Patent No.: US 7,247,875 B2
(45) Date of Patent: Jul. 24, 2007

(54) PROCESS FOR THE COLLECTION AND PRESENTATION OF AN X-RAY IMAGE STORED IN A PHOSPHOR LAYER

(75) Inventors: Werner Haug, München (DE); Detlef Brautmeier, Unterschleissheim (DE); Horst Scherer, Unterhaching (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 179 days.

(21) Appl. No.: 11/112,638

(22) Filed: Apr. 22, 2005

(65) Prior Publication Data

US 2005/0247897 A1 Nov. 10, 2005

(30) Foreign Application Priority Data

May 4, 2004 (EP) .................................. 04101903

(51) Int. Cl.
*G03B 42/08* (2006.01)
(52) U.S. Cl. ...................... 250/587; 250/584; 250/586; 250/591; 250/580
(58) Field of Classification Search ................ 250/587, 250/591, 586, 584, 585, 580
See application file for complete search history.

(56) References Cited

U.S. PATENT DOCUMENTS

| | | | |
|---|---|---|---|
| 4,851,678 A | 7/1989 | Adachi et al. | |
| 4,967,079 A | 10/1990 | Shimura | |
| 5,506,913 A | 4/1996 | Ibison et al. | |
| 5,644,649 A | 7/1997 | Schoeters et al. | |
| 5,651,042 A | 7/1997 | Dewaele | |
| 5,732,149 A * | 3/1998 | Kido et al. | 382/128 |
| 6,061,465 A | 5/2000 | Nakajima | |
| 6,373,074 B1 | 4/2002 | Mueller et al. | |
| 6,501,088 B1 | 12/2002 | Struye et al. | |
| 6,734,441 B2 | 5/2004 | Wendlandt | |
| 2002/0109113 A1 | 8/2002 | Wang et al. | |
| 2003/0098423 A1* | 5/2003 | Wendlandt | 250/484.4 |

FOREIGN PATENT DOCUMENTS

| | | |
|---|---|---|
| EP | 0287113 | 10/1988 |
| EP | 654762 | 5/1995 |
| EP | 1315030 | 5/2003 |

* cited by examiner

*Primary Examiner*—David Porta
*Assistant Examiner*—Djura Malevic
(74) *Attorney, Agent, or Firm*—Houston Eliseeva LLP

(57) ABSTRACT

A process for the collection and presentation of an X-ray image stored in a phosphor layer, includes the steps of: collecting information in an area of the phosphor layer and in an area adjacent to, and outside of, the phosphor layer; dividing the information collected into image information and edge information, taking into account a run of the information collected, whereby the image information corresponds to the information collected in the area of the phosphor layer, and the edge information corresponds to the information collected in the area adjacent to, and outside of, the phosphor layer; and presenting the image information.

18 Claims, 2 Drawing Sheets

PROCESS FOR THE COLLECTION AND PRESENTATION OF AN X-RAY IMAGE STORED IN A PHOSPHOR LAYER

FIELD OF THE INVENTION

The invention relates to a process for the collection and presentation of an X-ray image stored in a phosphor layer.

BACKGROUND OF THE INVENTION

X-ray images can be stored in so-called storage phosphors, whereby X-ray radiation passing through an object, for example a patient, is stored as a latent image in a phosphor layer. In order to read out the latent image, the phosphor layer is irradiated with stimulation light, and so stimulated into emitting emission light. The emission light, the intensity of which corresponds to the image stored in the phosphor layer, is collected by an optical detector and converted into electric signals. The electric signals are further processed, as required, and finally made available for examination, in particular for medical/diagnostic purposes, whereby they are displayed in corresponding display equipment, such as eg. a monitor or a printer.

In several areas of application of this technology, also known as computer radiography, due to medical stipulations care should be taken to ensure that the X-ray information stored in the phosphor layer is collected as completely as possible at least in the area around the edge of the phosphor layer so that the greatest amount possible of diagnostic information is made available. This is especially applicable, for example, for mammographic applications.

With established processes in accordance with the prior art, phosphor layers are therefore scanned, ie. read out, as accurately as possible up to the edge of the layers. For this, relatively complex steering of the scanner is generally required. At the same time, with the established processes greater position tolerances for the phosphor layer relative to the scanner are mostly not taken sufficiently precisely into consideration, so that in some cases an undesirably or unpermissibly high level of loss of diagnostic information can occur.

It is the aim of the invention to provide a process for the collection and presentation of an X-ray image stored in a phosphor layer, whereby to the greatest extent possible, all of the X-ray information stored in the phosphor layer can be collected and presented, with increased reliability.

SUMMARY OF THE INVENTION

The above and other problems are solved by a process for the collection and presentation of an X-ray image stored in a phosphor layer that includes the steps of: collecting information in an area of the phosphor layer and in an area adjacent to, and outside of, the phosphor layer; dividing the information collected into image information and edge information, taking into account a run of the information collected, whereby the image information corresponds to the information collected in the area of the phosphor layer, and the edge information corresponds to the information collected in the area adjacent to, and outside of, the phosphor layer; and presenting the image information.

BRIEF DESCRIPTION OF THE DRAWINGS

The invention is described in greater detail by means of figures.

DETAILED DESCRIPTION OF THE PREFERRED EMBODIMENTS

Figure 1:
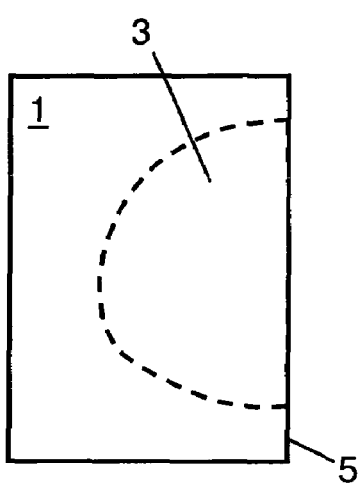
FIG. 1 shows a phosphor layer in which an X-ray image is stored.

The invention is based upon the idea of scanning over the edge of the phosphor layer, and in so doing, collecting not only the actual image information contained in the phosphor layer, but also edge information from an area adjacent to the phosphor layer outside of the phosphor layer. The size of this area adjacent to the phosphor layer, which is to be scanned in addition, is to be chosen to be of such a size that the position tolerances to be expected for the phosphor layer relative to the scanner lie within this area. The information collected, which at first can not be identified either as image or edge information, is then divided into an area for the image information and an area for the edge information. This division takes place in accordance with the invention dependent upon the run of the information collected in the area around the edge of the phosphor layer. Preferably, the information collected is represented by the intensity run of the light collected during the scanning process so that, in particular, a change in intensity to a specific degree can imply the edge of the phosphor layer, and a corresponding division into image and edge information is made possible. The image information gained in this way is then presented, preferably in the negative form, and is available for a diagnostic analysis.

The process in accordance with the invention makes possible very reliable collection and presentation of the greatest proportion possible of the X-ray information contained in the phosphor layer, even when the phosphor layer has large position tolerances.

In a preferred embodiment of the process in accordance with the invention, it is proposed that:

1) the information collected is divided into a number of lines;

2) for each of the lines, a line limit is determined which divides the information in the respective line into line image information and line edge information; and 3) from the line limits determined for the individual lines, an image limit is deduced which divides the information collected into the image information and the edge information.

In this way, particularly reliable division of the information collected into image information and edge information is guaranteed, with very little loss of information.

It is preferred that the run of the image limit corresponds to a straight line which is fitted to the line limits determined. By means of this straight line fit, an average is calculated using the individually determined line limits so that large deviations of individual line limits, eg. around the corners of the phosphor layer, have considerably less effect upon the position of the deduced image limit than a number of line limits with essentially the same or a similar position. Moreover, an image limit with a straight run makes it possible to achieve separation of image information and edge information which is easily identifiable to the human eye, and this is particularly advantageous for the diagnostic analysis.

Simple and reliable determination of the line limits is achieved by each of the line limits being established with an intensity value which forms an average value between a maximum intensity and a minimum intensity in a selected section of the run of the information for the respective line.

It is also advantageous to test the quality of individual line limits and only then to use them in order to deduce the image limit if they fulfill a pre-specified condition. Deduction of the image limit in this way is particularly reliable.

In a preferred embodiment of this process variation, the line limits are then tested to see whether the difference between the maximum and the minimum intensity in the selected section of the run of the information exceeds a pre-specifiable minimum value. Only those line limits for which this condition is fulfilled are used for deducing the image limit. In this way, the deduction of the image limit is not falsified by line limits which are determined in areas where there are brittle or poorly defined edges or corners of the phosphor layer.

A further variation of the process proposes that after the straight line has been fitted to the line limits determined, a deviation of the respective line limits from the fitted straight line is calculated, and those line limits are chosen, the deviation of which is less than a pre-specifiable top value, and a new straight line is fitted to the line limits chosen in this way, which then serves as the image limit.

In a preferred embodiment of the process in accordance with the invention, it is proposed to set the edge information at at least a pre-specifiable value. When presenting the edge information in addition to the image information, it is possible in this way to particularly clearly distinguish the edge information from the image information. It is particularly advantageous here, in particular with a negative presentation of the image and edge information, to present the edge information as a dark, and in particular an evenly black area. In this way, one also achieves the advantage that the observation of the image information presented is not impaired by edge information shown by a light colour, in particular, white. As, namely, experience from diagnostic practice has shown, the analysis of the image information presented is perceptibly impaired by an edge that is too light or white. Because the edge information is set at a pre-specifiable value and is presented as a dark, in particularly an evenly black area, as well as good recognition of the edge, dazzling of the observer is at the same time avoided.

In an alternative variation of this process, the image information, in particular in negative form, is presented against a dark, and in particular an evenly black, background. In this case, an additional presentation of the edge information is dispensed with. By presenting the image information against the dark background, the advantages already described in connection with the corresponding presentation of the edge information are achieved.

In a preferred further development of the variation of the invention described, the edge information or the background, in particular in negative form, is presented as darker than the darkest section of the image information. In this way, dazzling of the observer due to an edge or a background which is too light is avoided with a particularly high degree of reliability.

A further preferred embodiment of the process in accordance with the invention proposes that the image information and, if required, the edge information is presented on a screen or an image carrier, in particular in negative form. Preferably, a transparent material serves as the image carrier onto which the information collected is printed by means of a printer, and which can be observed against an illuminated background in a so-called light box.

FIG. 1 shows a phosphor layer 1 in which, when an X-ray is taken, an X-ray image is stored by means of X-ray radiation. In the example shown of a mammographic X-ray, the X-ray information obtained from the breast tissue to be investigated is essentially located within section 3 indicated by dashes, which extends up to an edge 5 of the phosphor layer 1. This position is determined by the fact that, with mammographic X-rays, the phosphor layer is located at close as possible to the patient's chest so that, as far as possible, the whole breast is X-rayed. The edge 5 of the phosphor layer 1 is therefore often called the "chest wall side".

Figure 2:
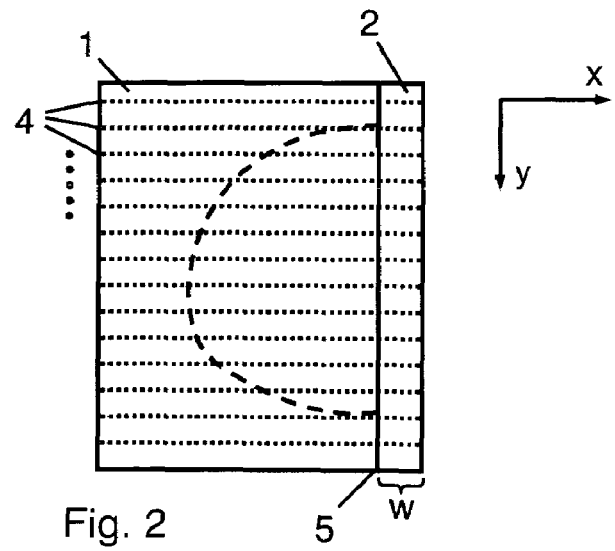
FIG. 2 shows the phosphor layer shown in FIG. 1 which is scanned by the process in accordance with the invention.

FIG. 2 shows the phosphor layer 1 shown in FIG. 1 which is read out using the process in accordance with the invention. The phosphor layer 1 here is irradiated line by line with stimulation light, and so stimulated into emitting emission light. The emission light, the intensity of which depends upon the X-ray information stored in the phosphor layer 1 is detected by an optical detector. There is essentially a choice of two processes for the line by line collection of the X-ray information contained in the phosphor layer 1.

With the method described in the patent document U.S. Pat. No. 6,501,088 B1, herein incorporated by reference in its entirety for background information only, the stimulation light in the form of a laser beam on a rotating mirror is deflected in such a way that the laser beam passes over the phosphor layer 1 along a line. At the same time, the emission light thus stimulated in the phosphor layer 1 at specific intervals of time, and so dependent upon location, is collected. By scanning a number of individual lines in a corresponding manner, a two-dimensional image of the X-ray information stored in the phosphor layer 1 is finally obtained.

With the method described in the patent document U.S. Pat. No. 6,373,074 B1, herein incorporated by reference in its entirety for background information only, a so-called line scanner is used, with which, by means of a line light source, a whole line of the phosphor layer 1 is respectively irradiated with stimulation light, and the emission light coming from this line is collected by a linear detector array.

In the example shown in FIG. 2, the lines in which the X-ray information contained in the phosphor layer 1 is collected, run along the lines 4 drawn in the figure. Alternatively, the lines in which the X-ray information are collected, can also run at right angles to the lines 4 illustrated. In both cases, a two-dimensional image of the X-ray information in the spatial directions x and y is obtained. With common phosphor layer dimensions of approx. 18×24 cm or 24×30 cm, a corresponding image has approx. 3600 or 4800 pixels in the x direction and approx. 4600 or 5800 pixels in the y direction.

It is proposed, in accordance with the invention, to scan not only the phosphor layer 1, but also an area 2 adjacent to the phosphor layer 1, which lies outside of the phosphor layer 1. The width w of this area 2 is chosen so that the phosphor layer 1 still lies within this area 2, even if there are substantial positional inaccuracies relative to the scanner, eg. as a result of twisting or displacement of the phosphor layer 1 in relation to a desired position. Typically, the width w of the area 2 lies within approx. 1 and 10 mm, and in particular approx. 3 mm. Typically, approx. 40 to 70 pixels in the x direction correspond to this width w.

The two-dimensional information collected in this way is then divided into a number of lines 4, which run at right angles to the edge 5 of the phosphor layer 1, and so respectively lie, partially, in the area of the phosphor layer 1, and partially, in the area 2 adjacent to this outside of the phosphor layer 1. If the information collected includes, for example, 3600 times 4600 individual pixels in the x and the y direction, it is possible to divide the information collected into max. 4600 lines 4. For reasons of clarity, only a few lines 4 are shown in FIG. 2.

Figure 3:
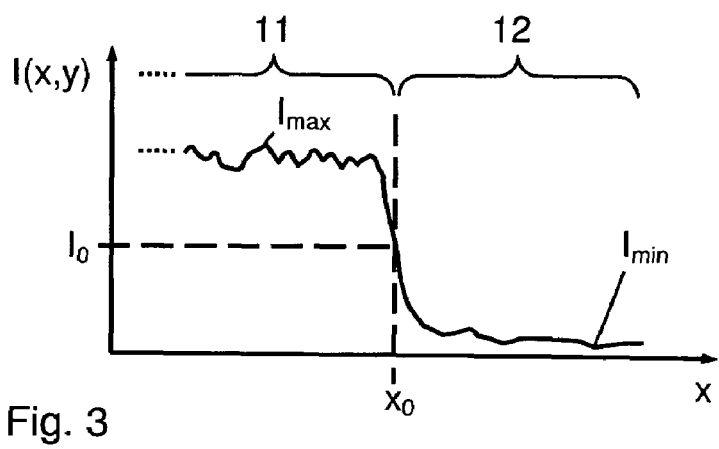
FIG. 3 shows a run of information collected by the process in accordance with the invention.

FIG. 3 shows a section from a run of the information along a line 4 of the example shown in FIG. 2. The information here corresponds to the intensity 1 (x, y) which was collected at different points x with a specific line position y.

As can be seen from the run of intensity 1 (x, y), this declines steeply, by means of which a division into image and edge information can be carried out as follows: A corresponding line limit $x_0$ is established for an intensity value $1_0$ which, in the example illustrated, forms the average value between a maximum intensity $1_{max}$ and a minimum intensity $1_{min}$ in the intensity 1 (x, y) run selected. Each line 4 (see FIG. 2) can thus be divided into line image information 11 and line edge information 12, and these are respectively separated by a line limit $x_0$.

Preferably, when determining the line limit $x_0$ from the maximum and minimum intensity $1_{max}$ and $1_{min}$, the whole run of the intensity 1(x, y) collected should not be used, but rather—as in the example from FIG. 3—a section with the width w on both sides of the supposed edge 5 of the phosphor layer 1. In this way, it is made possible to determine the individual line limits $x_0$ easily and quickly.

As explained below in greater detail in connection with FIG. 4, an image limit is finally deduced from the line limits $x_0$, which divides the two-dimensional intensity collected into an area with image and edge information.

Figure 4:
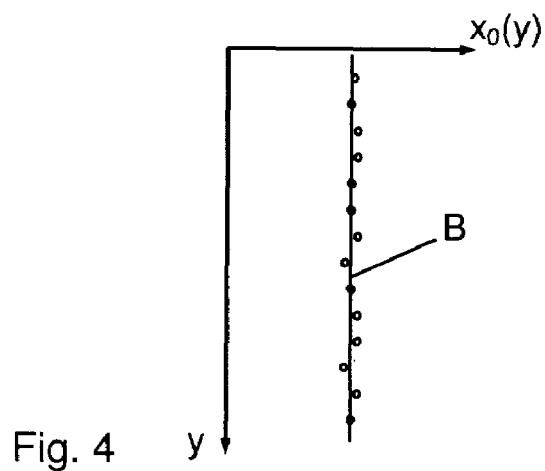
FIG. 4 shows line limits determined for individual lines with different line positions.

FIG. 4 shows the line limits $x_0(y)$ determined for individual lines 4 with respectively different line positions y. In order to even out fluctuations in the line limits $x_0$ determined for the individual lines 4, a straight line is fitted to the line limits $x_0$ which finally corresponds to an image limit B which separates the image information collected from the phosphor layer 1 from the edge information collected from the area 2 adjacent to this outside of the phosphor layer 1. Preferably, the line limits $x_0(y)$ determined are tested for quality or reliability prior to fitting of the straight line.

It is, for example, checked for each of the individual line limits $x_0(y)$ whether the respective difference between the maximum and the minimum intensity $1_{max}$ or $1_{min}$ exceeds a pre-specifiable minimum value. Only if this is the case can the line limit determined from this be sufficiently reliable and be used for deducing the image limit. Line limits, on the other hand, which do not fulfill this condition, are eliminated before deducing the image limit.

Another possibility for determining the quality or reliability of the line limits $x_0(y)$ established can also be to calculate an average deviation of the line limits $x_o(y)$ from the fitted straight line or an average value. If the deviation exceeds a pre-specifiable maximum value, the corresponding line limits $x_0(y)$ are eliminated. Preferably, a new straight line fit is then carried out upon the basis of the remaining line limits $x_0(y)$.

X-ray information is often reproduced in negative form for analysis purposes so as to obtain a presentation which can be compared with X-ray film images.

Figure 5:
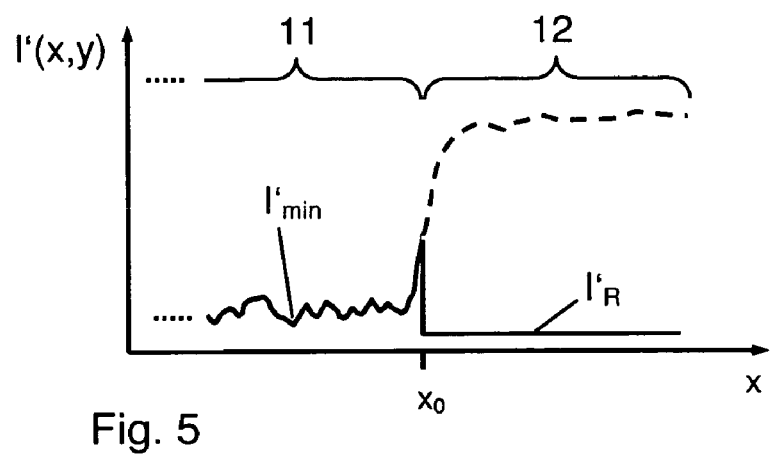
FIG. 5 shows a negative presentation of the run shown in FIG. 3 with edge information set at a fixed value.

FIG. 5 shows this type of negative form of the run of the information collected shown in FIG. 3, with edge information set at a fixed value. The run of the information 1'(x, y) shown in negative form corresponds here to a run of intensity 1(x, y) which is reflected around a horizontal axis. In this negative form, the edge information 12 (run shown by dashes) would appear clearly lighter than the image information 11. With a presentation of the image and edge information 11 and 12, the light section of the edge information would lead to undesirable dazzling of the observer. For this reason, with the process in accordance with the invention, the edge information 12 is set at a fixed value $1'_R$ so that this appears as an evenly dark, and in particular black, area when presented. In the example shown, the value $1'_R$ is chosen so as to particularly reliably avoid the effects of dazzling, and so it is less than the lowest intensity $1'_{min}$ in the area of the image information 11 in negative form: $1'_R < 1'_{min}$. This can be achieved simply in that the intensity 1(x, y) collected is set to the highest value possible after determination of the image limit B in the area of the edge information 12, and this value is in particular higher than the highest intensity $1_{max}$ in the area of the image information 11 (see FIG. 3). The edge information 12 with this value accordingly appears in the negative form (see FIG. 5) darker than the darkest point in the image information 11 area.

Figure 6:
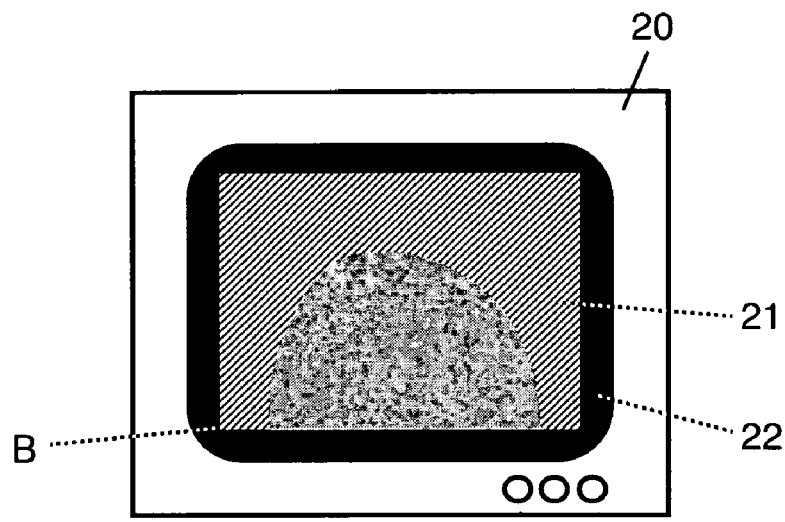
FIG. 6 shows a negative presentation of image information on a screen.

FIG. 6 shows a negative presentation of the image information 21 obtained by the process in accordance with the invention on a screen 20. It is presented against a dark background 22 which is evenly black in the example shown. The edge information obtained in the originally collected information was separated from the image information 21 along the image limit B, and is not shown. The reproduced image information 21 therefore borders with the image limit B directly onto the dark background 22, by means of which dazzling of an observer is avoided despite the negative form, and so a high level of reliability is guaranteed when making a diagnostic analysis of the image information 21.

Figure 7:
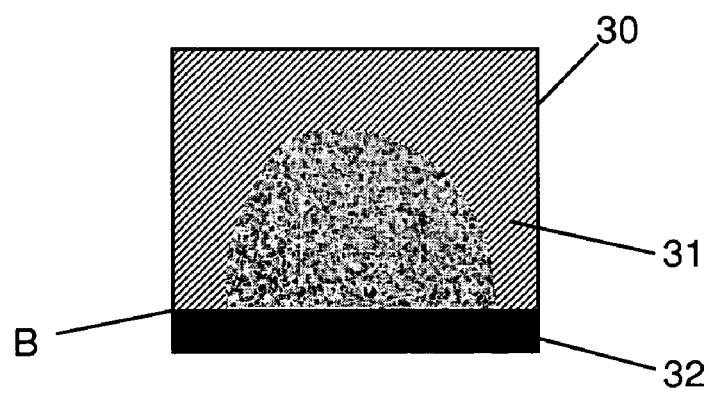
FIG. 7 shows a negative presentation of the image and edge information on an image carrier.

FIG. 7 shows a negative form of the image and edge information on an image carrier 30. The image carrier 30 is preferably a transparent carrier material, such as for example a synthetic film onto which the image and edge information 31 and 32 to be presented are displayed, or in particular, printed. By setting the edge information 32 at a pre-specified value, in accordance with the invention,—as described in connection with FIG. 5—this is shown with the negative form in question as an evenly black area. If the image carrier 30 shown is positioned in front of a light box for diagnostic purposes, the edge information 32 of the form in accordance with the invention is no longer dazzling and therefore problematic—as are negative forms in processes established in the prior art. Because, in particular with mammographic X-rays an analysis of the x-rayed breast tissue must go right up to the edge 5 of the phosphor plate 1 (see FIG. 1) or the image limit B of the image information 31, a correspondingly formed, evenly dark edge area 32 is particularly advantageous on the mammograph section.

The invention claimed is:

1. A process for the collection and presentation of an X-ray image stored in a phosphor layer, the process comprising the steps of:
   collecting information in an area of the phosphor layer and in an area adjacent to, and outside of, the phosphor layer;
   dividing the information collected into a number of lines;
   determining a line limit for each of the lines, said line limit dividing the information in the respective line into line image information and line edge information, whereby each individual line limit is established at an intensity value which forms an average value between a maximum intensity and a minimum intensity in a selected section of the information of the respective line;

deducing, from the line limits determined for the individual lines, an image limit which divides the information collected into the image information and the edge information, whereby the image information corresponds to the information collected in the area of the phosphor layer, and the edge information corresponds to the information collected in the area adjacent to, and outside of, the phosphor layer; and presenting the image information.

2. The process in accordance with claim 1, whereby each individual line limit is tested for quality, and thereafter used for deducing the image limit when the individual line limit meets a pre-specified condition.

3. The process in accordance with claim 1, whereby
for each individual line limit, a test determines whether a difference between maximum and minimum intensity exceeds a pre-specifiable minimum value; and
only line limits that exceed the pre-specifiable minimum value are used for deducing the image limit.

4. The process in accordance with claim 1, whereby the image limit corresponds to a straight line which is fitted to the line limits determined.

5. The process in accordance with claim 4, whereby
for each of the line limits, a deviation of the respective line limit from the fitted straight line is calculated;
those line limits the deviation of which is less than a pre-specifiable top value are selected; and
a new straight line, which corresponds to the image limit, is fitted to the selected line limits.

6. The process in accordance with claim 1, whereby the edge information is set at a pre-specifiable value.

7. The process in accordance with claim 6, whereby the pre-specifiable value is chosen such that the edge information is presented as a uniformly dark area.

8. The process in accordance with claim 7, whereby the edge information is presented as darker than a darkest section of the image information.

9. The process in accordance with claim 1, whereby the image information is presented against a uniformly dark background.

10. The process in accordance with claim 9, whereby the background is presented as darker than a darkest section of the image information.

11. The process in accordance with claim 1, whereby the image information or the edge information is presented on a screen or an image carrier.

12. The process in accordance with claim 1, whereby the image information or the edge information is presented in negative form.

13. The process in accordance with claim 1, whereby the area adjacent to the phosphor layer is of a width which is chosen such that position tolerances to be expected for the phosphor layer, in particular as a result of twisting or displacement of the phosphor layer in relation to a desired position, lie within the area.

14. The process in accordance with claim 13, whereby the width of the area adjacent to the phosphor layer is between 1 mm and 10 mm.

15. The process in accordance with claim 13, whereby in the area of the width of the area adjacent to the phosphor layer, between 40 and 70 pixels are obtained.

16. The process in accordance with claim 13, whereby the selected section of the information of the respective line corresponds to twice the width of the area adjacent to the phosphor layer.

17. The process in accordance with claim 1, whereby the selected section of the information of the respective line corresponds to twice the width of the area adjacent to the phosphor layer.

18. The process in accordance with claim 1, wherein, for each individual line limit for each of the lines, the average value of the intensity is set between the minimum intensity and the maximum intensity in a selected section of the intensity distribution ($I(x,y)$) along that line and based on the average value of the intensity of that line, the individual line limit is determined out of the intensity distribution $I(x, y)$.

* * * * *

UNITED STATES PATENT AND TRADEMARK OFFICE
Certificate

Patent No. 7,247,875 B2                          Patented: July 24, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Werner Haug, Munchen (DE); Detlef Brautmeier, Unterschleissheim (DE); Horst Scherer, Unterhaching (DE); and Piet R. Dewaele, Sint-Niklaas (Nieuwkerken-Waas) (BE).

Signed and Sealed this Thirteenth Day of November 2007.

DAVID P. PORTA
*Supervisory Patent Examiner*
Art Unit 2884

UNITED STATES PATENT AND TRADEMARK OFFICE
CERTIFICATE OF CORRECTION

| | |
|---|---|
| PATENT NO. | : 7,247,875 B2 |
| APPLICATION NO. | : 11/112638 |
| DATED | : July 24, 2007 |
| INVENTOR(S) | : Werner Haug et al. |

It is certified that error appears in the above-identified patent and that said Letters Patent is hereby corrected as shown below:

On the Title Page, at item (75) Inventors:, after "Horst Scherer, Unterhaching (DE)," please insert --Piet R. Dewaele, Sint-Niklaas (Nieuwkerken-Waas) (BE)--.

Signed and Sealed this

Fourth Day of December, 2007

JON W. DUDAS
*Director of the United States Patent and Trademark Office*